(12) United States Patent
Danashekar et al.

(10) Patent No.: US 12,379,901 B2
(45) Date of Patent: Aug. 5, 2025

(54) APPLICATION FRAMEWORK FOR STRONGLY-TYPED PROGRAMMING LANGUAGES

(71) Applicant: BLOOMBERG L.P., New York, NY (US)

(72) Inventors: Swarup Danashekar, Hoboken, NJ (US); Heng Zhao, Stamford, CT (US); Timothy Heungsun Cho, Closter, NJ (US)

(73) Assignee: BLOOMBERG L.P., New York, NY (US)

( * ) Notice: Subject to any disclaimer, the term of this patent is extended or adjusted under 35 U.S.C. 154(b) by 152 days.

(21) Appl. No.: 18/182,188

(22) Filed: Mar. 10, 2023

(65) Prior Publication Data
US 2023/0289145 A1    Sep. 14, 2023

Related U.S. Application Data

(60) Provisional application No. 63/269,164, filed on Mar. 10, 2022.

(51) Int. Cl.
*G06F 8/30*    (2018.01)
*G06F 9/445*   (2018.01)

(52) U.S. Cl.
CPC ............ *G06F 8/30* (2013.01); *G06F 9/44505* (2013.01)

(58) Field of Classification Search
None
See application file for complete search history.

(56) References Cited

U.S. PATENT DOCUMENTS

| | | | |
|---|---|---|---|
| 2003/0009744 A1* | 1/2003 | Doyle | G06F 8/423 717/120 |
| 2005/0097532 A1* | 5/2005 | Beccario | G06F 8/437 717/141 |
| 2005/0149630 A1* | 7/2005 | Smolinski | H04L 51/04 709/227 |
| 2011/0035724 A1* | 2/2011 | Kettley | G06F 8/75 717/135 |
| 2011/0245932 A1* | 10/2011 | Schleiss | H04W 48/08 340/815.45 |
| 2017/0315795 A1* | 11/2017 | Keller | G06F 11/3006 |
| 2020/0278845 A1* | 9/2020 | Ravid | G06F 8/70 |
| 2022/0147333 A1* | 5/2022 | Malvankar | G06F 40/20 |

* cited by examiner

*Primary Examiner* — Qing Chen
(74) *Attorney, Agent, or Firm* — Chiesa Shahinian & Giantomasi PC

(57) ABSTRACT

The present disclosure is directed to methods, non-transitory computer readable storage medium, and systems. The disclosure includes a method to implement a strongly-typed software application operable in a computing environment in an application development framework, the method including: retrieving components from a database, wherein the components include: logic code configured to perform a task, input/output (I/O) code configured to provide input from a source to the logic code, and feature code configured to produce one or more functions; and automatically generating a configuration file, wherein the configuration file is in a strongly-typed programming language, and wherein the configuration file is configured to register the components into an executable software application.

20 Claims, 8 Drawing Sheets

```
20  bool handle(const std::vector<byte> &input)
21  {
22      std::vector<int> output; // convert input to wide
23      return server().messenger().publish(output);
24  }
```

FIG. 3

APPLICATION FRAMEWORK FOR STRONGLY-TYPED PROGRAMMING LANGUAGES

CROSS-REFERENCE TO RELATED APPLICATIONS

This application claims priority to U.S. Provisional Application No. 63/269,164, filed Mar. 10, 2022, the disclosure of which is incorporated herein by reference in its entirety.

TECHNICAL FIELD

The present invention relates generally to application frameworks and more particularly to application frameworks for strongly typed programming languages.

BACKGROUND OF THE DISCLOSURE

Application frameworks are software libraries that provide a structure to support development of applications for a specific environment. Many application frameworks focus on generating boiler-plate business code, where the developer must fill out placeholders, or stubs, with the code that defines a business use case. While this approach is useful for standardization, the framework unintentionally intertwines heavily with the business code. A few newer frameworks have taken a different approach—given the business code for the business use case, the framework generates boiler-plate code around the business code to produce a runnable service. However, implementing such a framework for strongly-typed programming languages, such as, e.g., C++, often requires declaring, or determining a name and a type of a variable or element, upfront, which can be challenging in the framework context.

SUMMARY

In accordance with one or more embodiments, methods, non-transitory computer readable storage medium and systems are provided.

Embodiments are directed to a method, a non-transitory computer readable storage medium having computer-executable instructions recorded thereon, and a system to implement a strongly-typed software application operable in a computing environment in an application development framework, the method comprising: retrieving components from a database, wherein the components comprise: logic code configured to perform a task, input/output (I/O) code configured to provide input from a source to the logic code, and feature code configured to produce one or more functions; and automatically generating a configuration file, wherein the configuration file is in a strongly-typed programming language, and wherein the configuration file is configured to register the components into an executable software application.

BRIEF DESCRIPTION OF THE DRAWINGS accompanying drawings, which are incorporated in and constitute a part of this specification, illustrate embodiments of the disclosure, and, together with the summary given above, and the detailed description of the embodiments below, serve as a further explanation and disclosure to explain and/or illustrate embodiments of the disclosure.

FIG. 3 is an excerpt of sample coding that converts JPEG bytes to a list of UUIDs.

COPYRIGHT NOTICE

Figure 1:
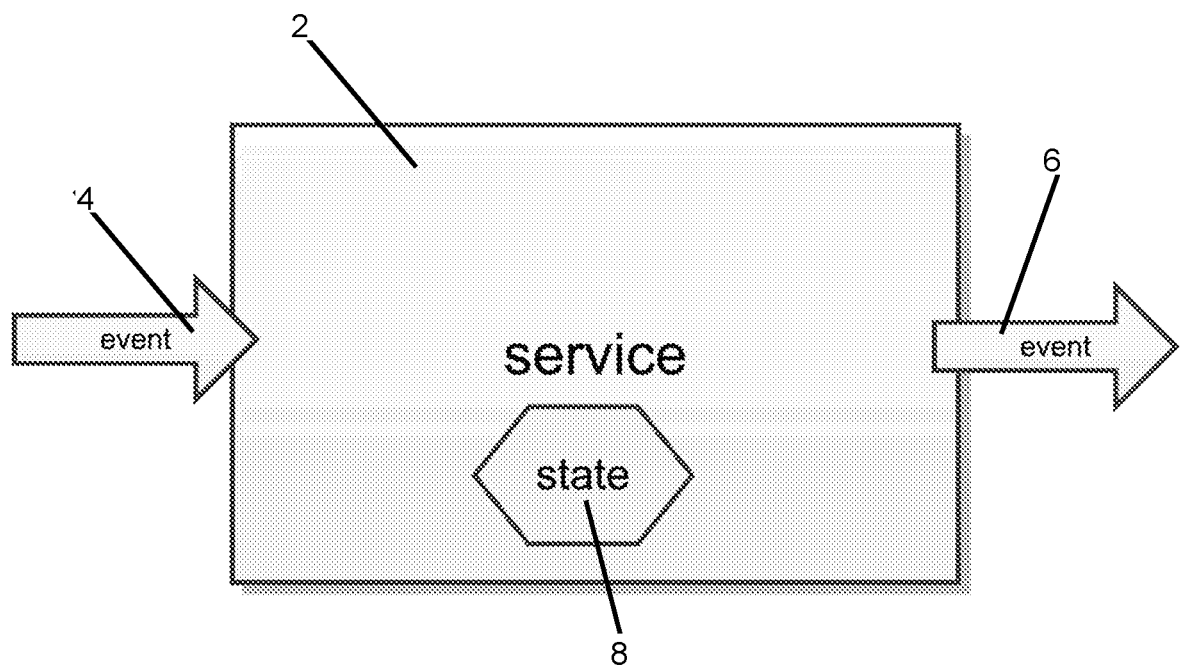
FIG. 1 is an illustration of an event driven system with some state management.

A portion of the disclosure of this patent document contains material that may be subject to copyright protection. The copyright owner has no objection to the facsimile reproduction by anyone of the patent document or the patent disclosure as it appears in the Patent and Trademark Office patent files or records, but otherwise reserves all copyrights whatsoever.

DETAILED DESCRIPTION OF THE DISCLOSURE

In accordance with one or more embodiments described herein, an application framework for developing and deploying software applications is provided. The application framework comprises three components for implementing a service: 1) a handler comprising business logic code for performing a particular task, 2) one or more resources representing I/O (input/output) code providing input from a source to the business logic or output from the business logic to a destination, and 3) features representing functionality to help productionize the service. In accordance with one embodiment, the application framework automatically retrieves each of the three components and automatically generates "glue" code that connects each of the three components. The automatically generated code is implemented using a configuration file, such as, e.g., a YAML configuration file.

Conventional frameworks are unable to work with strongly-typed programming languages because variables in such languages must be declared upfront. A strongly-typed language is a computer language in which the type of each variable is defined during compilation, thus, there cannot be type-inconsistencies. The compiler for a strongly-typed language will review each expression in a program being compiled, and will verify that the expression does not attempt to use an operator with inconsistent expressions.

Advantageously, the application framework in accordance with embodiments described herein enables a developer to identify components and services for the three components of the application framework in the configuration file, which can then be automatically retrieved from a library or registry, thereby providing dependency injection. Such dependency injection enables the application framework to work with strongly-typed programming languages. One example of a strongly-typed programming language used herein is C++. Other strongly-typed programming languages include, but are not limited to, C, C #, Java, Pascal, Python, and TypeScript. However, the application framework may work with any other suitable programming language (i.e., strongly-typed or not strongly-typed programming languages).

The application framework encapsulates the business use-case code into a single function which takes in interested events as arguments, allowing for the wiring of these functions to an event source. Moreover, the components of the framework can be independently configured using configuration files, and each is responsible for collecting and publishing metrics, providing a highly reusable system. In the embodiments presented herein, the "glue" code is generated automatically at deployment from the configuration file.

Additionally, in the embodiments presented herein, the developer is not required to know how their code is being pulled in and deployed. When a developer creates a component, it is placed in a registry, which lists all the pieces of code needed for compiling. Thus, a developer may use a reference to call various components in a configuration file, and the system will look at the configuration file and automatically pull the relevant components from a registry and compile the code.

In accordance with one embodiment, a service 2, e.g., an executable, can be modeled as an event driven system with some state management, as shown in FIG. 1.

The service 2 of FIG. 1 can be divided into a number of defined components, including an input event (receiving) 4, an output event (transmitting) 6 and a state management module(s) 8. Each component has a specific function, and the components are largely independent of each other, as illustrated in FIG. 2.

Figure 2:
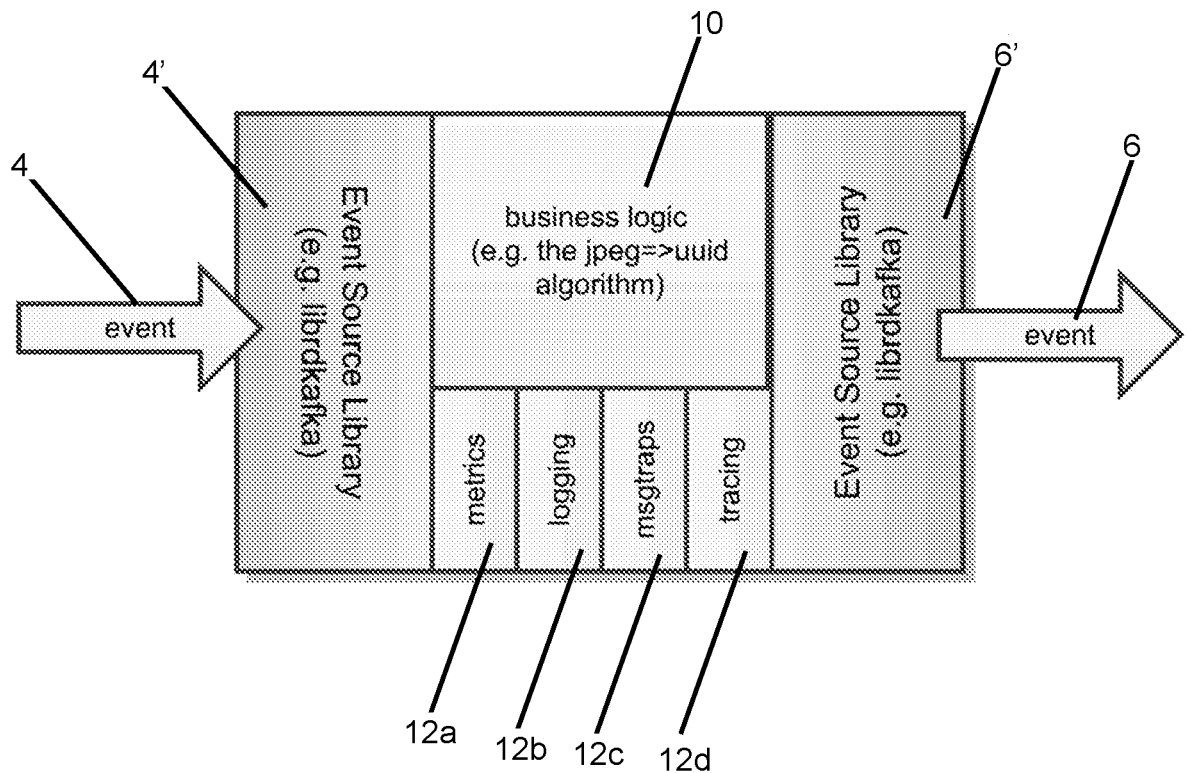
FIG. 2 is an illustration of components of the event driven system.

In the FIG. 2, the "business logic" block 10 represents the code for a business use-case. In one example, the business logic 10 is an algorithm that takes in bytes (JPEG) and outputs a list of universally unique identifier (UUIDs). This is termed as the Handler, as it handles event messages.

The "Event Source Library" blocks 4' and 6' represent the code that connects to a source (e.g., TCP socket, Kafka, Web service, etc.) and either receives 104' or publishes/transmits 106' events. As a general rule, any code that interacts with any I/O falls into this category. These blocks are referred to as Resources, a stock of events that can pull from or push to.

The metrics block 12a, logging block 12b, msgtraps block 12c and tracing block 12d represent components that help productionize the service. These components may be implemented as a light wrapper over certain standard practices. For example, logging utilizes Basic Application Library Logging (BALL), metrics publishes to Grand Unified Telemetry System (GUTS), etc. These are referred to as Features.

Conventionally, after finishing a business logic, an application developer must spend time understanding and writing up code to configure and invoke the other blocks in order to produce an executable—a runnable service. This is referred to as "glue" code. In accordance with embodiments described herein, the generation of this "glue" code is automated. Given that the Resources and Feature components are reusable, and the wiring is automated, the only remaining development to be written would be the Handlers. In other words, embodiments described herein provide the wiring to pre-built components. The auto-generated code is referred to as the Deployment.

As an example, as shown in FIG. 3, an algorithm is written that converts JPEG bytes to a list of UUIDs. The output is sent to a place called messenger( ).

Figure 4:
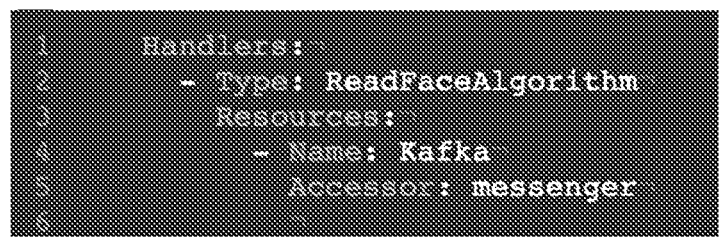
FIG. 4 is an excerpt of sample coding that expresses how the algorithm is wired and how to build a service.

In FIG. 4, a configuration file, e.g., a YAML configuration file, is shown that expresses how the algorithm is wired and how to build a service. "ReadFaceAlgorithm" refers to the function of FIG. 4.

When the YAML configuration file, an excerpt of which is shown in FIG. 4, is run through the presently disclosed build system, it will have automatically retrieved the three components and automatically generates an executable that will listen, actively or passively, for messages on any suitable messaging system, such as Kafka messaging system and invoke the algorithm's Handle function. Optionally, "Kafka" can be changed to ZeroMQ or TcpSockets and rebuilt, with predictable results. Multiple Resources can be added, like ZeroMQ and TCP Sockets, and the resulting executable will actively listen to all of them for events.

Figure 5:
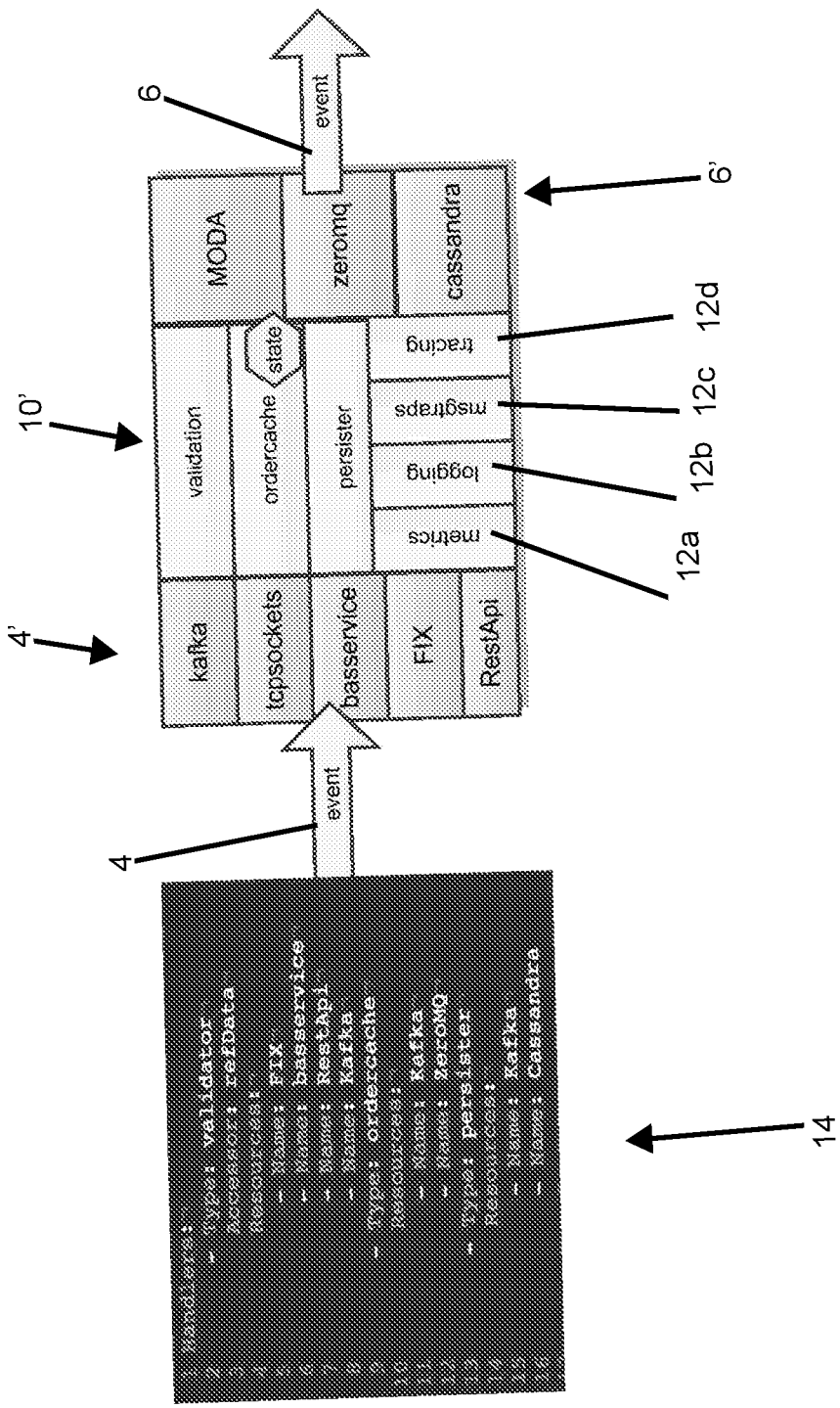
FIG. 5 is an excerpt of a YAML file and a resultant complex executable with multiple input/outputs dependencies.

Because the generation of wiring code is automated, it could be scaled up without writing and managing complex code. For example, the YAML file would result in a complex executable with multiple input/outputs dependencies, as shown in FIG. 5. In this embodiment shown in FIG. 5, the input code 14 is received by, in this event source library block 4' having certain block components. In other embodiments, the event source library block 4' can include, based on the desired functionality, more, different, and/or less blocks.

In this embodiment, the business logic block 10' includes validation, order cache, and persister blocks, collectively 10'. The validation, order cache, and persister blocks, of this embodiment, are the newly written code in this embodiment, with other embodiments and examples, based on the desired functionality, including more, different, and/or less blocks.

In this embodiment shown in FIG. 5, the configuration file is created as a portion of the event source library block 6', which has certain block components. In other embodiments, the event source library block 6' can include, based on the desired functionality, more, different, and/or less blocks.

The output event 6 comprises the automatically generated configuration file, with the configuration file being in a strongly-typed programming language.

Microservices

It is rare that a fully productionized product consists of just one service. Usually, a handful of services are created to work together to accomplish a use case for a product. In many systems, many smaller single-minded services can be independently developed, tested and deployed.

In the embodiments described herein, Deployment is a list of services that work together. In a Deployment configuration, all the services and how to build each of them is listed, which can be more advantageous than using microservices.

In this embodiment, many handlers can join together into the same service. This allows for the creation of very small to very large services, or for the creating of a monolith while enjoying the benefits of microservices. This concept can be represented by the following formula:

$$service = handler[s] + resource[s]$$

$$deployment = (service + runtime\ config) * n$$

All Resources (e.g., Kafka, ZeroMQ, Web Service, etc.) have advantages, with al combinations being suitable and any combination being determinable. Because the Handler-Resource wiring is deferred to the Deployment, multiple combinations can be tested by swapping them in and out.

For independence of the components, the framework uses dependency injection. As a result, unit test cases can be written. Since the building of a service is deferred to deployment, unit test cases may be relied upon for testing.

In the framework, developers can list their runtime dependencies in the YAML file. If they are not listed and one of the components uses them, the compilation could fail. This failure allows for a correction checklist of runtime dependencies which otherwise would be lost or cumbersome to maintain. For example, by looking at the YAML file it is simple to identify the services that require market data.

Since the components can be reused across multiple deployments, and each deployment can be individually adjusted (e.g., in the runtime configuration), the runtime configurations are tied to the deployment. This helps manage the configuration of an entire system in a single place. This can be useful for microservice deployments with a large number of microservices. Services can not only share the configuration, but the context will be in a single place.

Conceptually, the framework may be separated into 4 components. While the first 3 may be built as independent libraries, e.g., C++ libraries, the last one pulls all the libraries together to build a service. An example of the framework is shown in FIG. 6.

Figure 6:
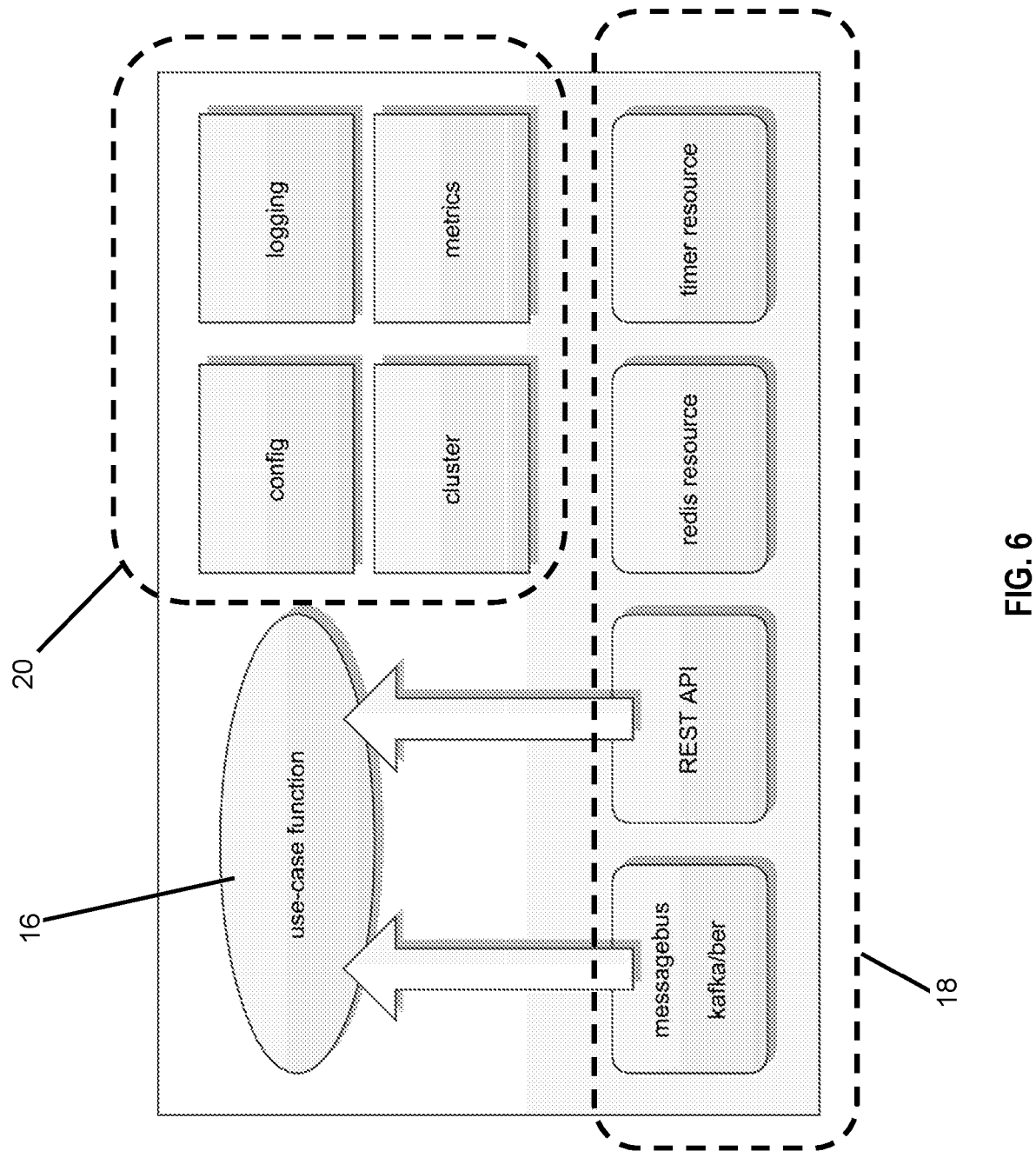
FIG. 6 is an illustration of a sample framework of a micro-service architecture having multiple small services making up one larger system.

The "use-case function" block 16 shown in FIG. 6 represents the Handlers. The "messagebus," "REST API," "redis resource," and "timer resource" blocks, collectively 18, represent the Resources. The "config," "logging," "cluster," and "metrics" blocks, collectively 20, represent the Features. The encompassing large rectangle, encompassing the Handlers, the Resources, and the Features, represents the Deployment (single executable).

Handler

The handler comprises the 'business logic' 110 with a predictable and relevant interface. The Handler should be reactive to messages, i.e., waiting on messages. In the example discussed herein, the face recognition algorithm is the Handler.

```
// array_of_uuids handle (array_of_bytes)
std::vector<unsigned int> handle (std::vector<std::byte>)
```

For the Handler, the source of the std::vector<std::byte> is not a consideration. In this embodiment, the algorithm could be transmitted through any suitable messaging protocol, such as Kafka, RestAPI, and/or raw TCP socket. Furthermore, it could be encoded into any suitable data, such as a JSON array, CSV, or simply raw bytes. The suitable messaging protocol and the suitable data can be determined before the handler is invoked.

Resource

The resource is a universal bucket for all supporting infrastructure. In most cases, the Resource comprises an out-of-process I/O call. Resources are responsible for reading data over some I/O, converting the received data to a message that the handler understands, and delivering it to the handler. There are 2 categories of resources:

active: On an incoming message, the resource invokes the handler. E.g., message-bus(kafka/json, zermq/JSON etc.), web server, and job queue.

passive: handler can invoke services of a resource when business logic 10 needs it. E.g., Database, Files, timer, etc.

Since the framework utilizes only a single main thread, no resource should block forever. For the first category, resources should be poll-able. If the underlying infrastructure does not support polling, there are helper libraries that convert them into poll-able.

Features

The framework discussed herein may utilize many standard libraries to support features like, e.g., logging, metrics, traceability, scalability, etc. These generic features should be available regardless of handlers or resources. During deployment, the default choices can be overridden with any available alternatives.

Deployment

An element of the Deployment is the YAML config file that details which components need to be pulled in and how to incorporate them together. The code generation tool uses this YAML file to generate code and build a service (executable) which, along with the runtime configuration file, becomes the deployable unit. For larger systems, multiple such interdependent services can be built that can be deployed as a single unit. These are useful in micro-service architecture where multiple small services make up one larger system, as shown in FIG. 6.

In FIG. 6, code connecting the Handler 16, the Resources 18, and the Features 20 is generated code, which can be expressed in a configuration file. The code generation tool can use this configuration file to generate buildable code—resulting in a deployable service (task). The resulting service, along with runtime configuration files, will be deployed and run in the target cluster.

Terms compile-time configuration: the config file that contains the instructions to generate the code run-time configuration: the traditional config file that is supplied to the service when it is started Deployment repo does not contain any C++ code. It only houses compile-time and runtime configurations. On invoking the build, it will generate the C++ code using a compile-time config file and builds an executable.

In the compile-time configuration file, details of the service (task) are specified, including what handlers are needed, e.g., what business logic 10 needs to be run; which active resources will be supplying the messages to the handlers; which passive resources are needed for the proper working of the handler; and how can each component accesses other components.

Multiple such services can be specified in the file, creating a type of a micro-service system. As stated above, this can be represented as the following formulas:

$$service = handler[s] + resource[s]$$

$$deployment = (service + runtime\ config) * n$$

Registration

All components (handlers, resources, and sub-components) can be registered in a YAML configuration file, e.g., optimus_register.yaml. For example the configuration shown in Table 1 below:

TABLE 1

```
- type: AptOmHandler
  category: handler
  repo: apt/aptom
  binary-package: libaptom-dev
  library: aptom
  header: aptom_handler.h
  class: aptordermanager::AptOrderManager
  tags: ''
```

TABLE 1-continued

```
- type: RedisResource
  category: resource
  repo: apt/redis-resource
  binary-package: libredisresource-dev
  library: redisresource
  header: redisresource_resource.h
  class: redisresource::RedisResource
  tags: " "
```

A portion of the disclosure of this patent document contains material that may be subject to copyright protection. The copyright owner has no objection to the facsimile reproduction by anyone of the patent document or the patent disclosure as it appears in the Patent and Trademark Office patent files or records, but otherwise reserves all copyrights whatsoever.

Whenever RedisResource is specified, the code generation tool will include the file in the header, add library to the CMakeLists.txt, add binary-package to the debian/control file, and use class to generate the object in the code, e.g., C++ code. This registration enables hiding of important aspects for pulling in libraries, compiling, and linking. This way, the user can just specify the type. The registration supports various other features such as CMake-find-package and the like.

Compile-Time Configuration

The entire system can be built by specifying the handlers and resources in this YAML file. An example of a service is shown below:

```
- Server: FaceRecog
  Handlers:
  - Type: FaceRecogHandler
    Resources:
    - Name: FooSource
```

A service called FaceRecog.tsk is created which comprises FaceRecoghandler business logic 10 that is powered, i.e., supplied messages, by a resource called FooSource. Note, the keyword Type will direct the code generation tool to use the registry to look up what is meant. Here, it will expect FaceRecogHandler to be registered there.

Since Resources need more information for configuration, an alias can be used here. This also allows for other handlers which may want to use the same Resource—the alias can be reused. In the YAML config file, what the alias FooSource means can be expanded, for example, as follows:

```
FooSource:
  Type: WebResource
```

FooSource is a WebResource. Incoming messages on the WebService will be delivered to the FaceRecoghandler. If a more complex resource like AptMessageBusResource is needed, which requires sub-components transport and encoder, it can be defined as follows:

```
FooSource:
  Type: MessageBus Resource
  transport:
    Type: CppKafkaTransport
  encoder:
    Type: AptDemoIntEncoding
```

Note, the keyword Type will direct code generation tool will use the registry to look up what is meant. In the registry, each Resource will specify if it needs any sub-components. In this case, FooSource is being defined to be MessageBus-Resource with two sub-components: CppKafkaTransport for transport and AptDemoIntEncoding for encoder.

An example of the approximate generated code is shown in Table 2 below:

TABLE 2

```
using FooSource = WebResource;
FaceRecogHandler kah;
// ....
void setup( )
{
  resources.emplace_back<FooSource>(kah);
}
// ....
void start( )
{
  for(auto &r : resources)
  {
    r.recover( );
  }
  while(true)
  {
    for( auto &r : resources)
    {
      r.poll( );
    }
  }
}
```

A portion of the disclosure of this patent document contains material that may be subject to copyright protection. The copyright owner has no objection to the facsimile reproduction by anyone of the patent document or the patent disclosure as it appears in the Patent and Trademark Office patent files or records, but otherwise reserves all copyrights whatsoever.

For FooSource=MessageBusResource the only thing that changes is one line.

```
// using FooSource = AptMessageResource<WebService>;
using FooSource = AptMessageResource<CppKafkaTransport,
AptDemoIntEncoding>;
```

See the following example in Table 3:

TABLE 3

```
Server: FaceRecog
  Handlers:
  - Type: FaceRecogHandler
    Resources:
    - Name: FooSource1
    - Name: FooSource2
    FooSource1:
      Type: WebResource
    FooSource2:
      Type: MessageBusResource
      transport:
        Type: CppKafkaTransport
      encoder:
        Type: AptDemoIntEncoding
```

A portion of the disclosure of this patent document contains material that may be subject to copyright protection. The copyright owner has no objection to the facsimile reproduction by anyone of the patent document or the patent disclosure as it appears in the Patent and Trademark Office patent files or records, but otherwise reserves all copyrights whatsoever.

Here, a task is created called FaceRecog.tsk which has the FaceRecoghandler business logic 10 and gets messages from two resources. In other words, FaceRecog.tsk is a Web service listening for messages and listening on Kafka topic for messages encoded in 'DemoIntEncoding'.

An approximately generated code for this is the following, as seen in Table 4:

TABLE 4

```
using FooSource1 = WebResource;
using FooSource2 = MessageBusResource<CppKafkaTransport,
AptDemoIntEncoding>;
FaceRecogHandler kah;
// ....
void setup( )
{
 resources.emplace_back<FooSource1>(kah);
 resources.emplace_back<FooSource2>(kah);
}
// ....
void start( )
{
 for( auto &r : resources)
 {
 r.recover( );
 }
 while(true)
 {
 for(auto &r : resources)
 {
 r.poll( );
 }
 }
}
```

A portion of the disclosure of this patent document contains material that may be subject to copyright protection. The copyright owner has no objection to the facsimile reproduction by anyone of the patent document or the patent disclosure as it appears in the Patent and Trademark Office patent files or records, but otherwise reserves all copyrights whatsoever.

The code below creates a task FaceRecog.tsk that has two business logics 110: FaceRecogHandler and FaceRecogModelTrainer. FaceRecogHandler gets messages from WebService and Kafka, while FaceRecogModelTrainer gets messages from Kafka. It is acceptable, even desirable, to have multiple handlers in the same service, as shown in Table 5.

TABLE 5

```
- Server: FaceRecog
  Handlers:
  - Type: FaceRecogHandler
    Resources:
    - Name: FooSource1
    - Name: FooSource2
  - Type: FaceRecogModelTrainer
    Resources:
    - Name: FooSource2
  FooSource1:
    Type: WebResource
  FooSource2:
    Type: MessageBusResource
    transport:
    Type: CppKafkaTransport
    encoder:
    Type: AptDemoIntEncoding
```

A portion of the disclosure of this patent document contains material that may be subject to copyright protection. The copyright owner has no objection to the facsimile reproduction by anyone of the patent document or the patent disclosure as it appears in the Patent and Trademark Office patent files or records, but otherwise reserves all copyrights whatsoever.

In the code below, FaceRecogModelTrainer computes a model with the messages it receives, which is to be used by FaceRecoghandler, as shown in Table 6 below:

TABLE 6

```
using FooSource1 = WebResource;
using FooSource2 = MessageBusResource<CppKafkaTransport,
AptDemoIntEncoding>;
FaceRecogHandler kah;
```

TABLE 6-continued

```
FaceRecogModelTrainer kamt;
// ....
void setup( )
{
 resources.emplace_back<FooSource1>(kah);
 resources.emplace_back<FooSource2>(kah, kamt);
}
// ....
void start( )
{
 for(auto &r : resources)
 {
 r.recover( );
 }
 while(true)
 for(auto &r : resources)
 {
 r.poll( );
 }
 }
}
```

A portion of the disclosure of this patent document contains material that may be subject to copyright protection. The copyright owner has no objection to the facsimile reproduction by anyone of the patent document or the patent disclosure as it appears in the Patent and Trademark Office patent files or records, but otherwise reserves all copyrights whatsoever.

In order for the handlers to access each other, the concept of Accessors is introduced. Making a slight change to the code from above, as shown in Table 7 below:

TABLE 7

```
- Server: FaceRecog
  Handlers:
  - Type: FaceRecogHandler
    Resources:
    - Name: FooSource1
  - Type: FaceRecogModelTrainer
    Accessor: modelTrainer # added this line
    Resources:
    - Name: FooSource2
  FooSource1:
    Type: WebResource
  FooSource2:
    Type: MessageBusResouce
    transport:
    Type: CppKafkaTransport
    encoder:
    Type: AptDemoIntEncoding
```

A portion of the disclosure of this patent document contains material that may be subject to copyright protection. The copyright owner has no objection to the facsimile reproduction by anyone of the patent document or the patent disclosure as it appears in the Patent and Trademark Office patent files or records, but otherwise reserves all copyrights whatsoever.

This will add the following in the generated code:

FaceRecogModelTrainer& modelTrainer( ) {return kamt;}

Somewhere in the FaceRecogHandler code, e.g., in handle function, to following can be done:

auto modelTrainerHandler=server( ).modelTrainer( )

Further, Accessors can be introduced to Resources as shown below in Table 8:

TABLE 8

```
- Server: FaceRecog
  Handlers:
  - Type: FaceRecogHandler
    Resources:
    - Name: FooSource1
  - Type: FaceRecogModelTrainer
    Accessor: modelTrainer
```

TABLE 8-continued

```
        Resources:
          - Name: FooSource2
            Accessor: trainerResource # added this line
        FooSource1:
          Type: WebResource
        FooSource2:
          Type: MessageBusResouce
          transport:
            Type: CppKafkaTransport
          encoder:
            Type: AptDemoIntEncoding
```

A portion of the disclosure of this patent document contains material that may be subject to copyright protection. The copyright owner has no objection to the facsimile reproduction by anyone of the patent document or the patent disclosure as it appears in the Patent and Trademark Office patent files or records, but otherwise reserves all copyrights whatsoever.

The generated code will add the following:

FooSource2& trainerResource( ){return fooSource2;}

In FaceRecogModelTrainer code the following can be done, provided AptDemoIntEncoding understands ThankYouMsg:

```
        ThankYouMsg thankyou;
        server( ) .trainerResource( ) .publish (thankyou) ;
```

Since Accessors are available in Server scope, the above code can be in FaceRecogHandler and be valid.

Regarding passive resources—Resources that are not listening for messages but are invoked from the handler, e.g., if FaceRecogModelTrainer, instead of getting messages from Kafka, reads from a database on startup. Assuming a database resource is just a simple query-able resource and does not monitor for new records, it is determined to be a passive resource. In that case, the following code can be implemented, as shown in Table 9 below:

TABLE 9

```
- Server: FaceRecog
  Handlers:
  - Type: FaceRecogHandler
    Resources:
    - Name: FooSource1
    - Type: FaceRecogModelTrainer
      Accessor: modelTrainer
    Resources: # Note: this Resource is not under any Handler.
    - Name: FooSource2
      Accessor: trainingDatastore
    FooSource1:
      Type: WebResource
    FooSource2:
      Type: DatabaseResource
```

A portion of the disclosure of this patent document contains material that may be subject to copyright protection. The copyright owner has no objection to the facsimile reproduction by anyone of the patent document or the patent disclosure as it appears in the Patent and Trademark Office patent files or records, but otherwise reserves all copyrights whatsoever.

Note that FooResource2 is configured under the Server level. This means that it is not powering, i.e., supplying messages, to any handler. It also has an accessor trainingDatastore. The generated code is as follows:

```
DatabaseResource* databaseResource;
    void setup( )
    {
      databaseResource =
passiveResources.emplace_back<DatabaseResource>( ) . first;
      DatabaseResource& trainingDatastore( )
      { return *databaseResource;
      }
```

Thus, any handler in the service can do the following:

```
auto dataStore = server( ) . trainingDatastore( ) ;
auto data = dataStore. execute ("SELECT * . . . . " ) // using agreed upon api
```

An additional example is show below in Table 10:

TABLE 10

```
Tasks:
  - Server: FaceRecog
    Handlers:
    - Type: FaceRecogHandler
      Resources
      - Name: FooSource1
      - Type: FaceRecogModelTrainer
        Resources:
        - Name: FooSource2
  - Server: crunchdata
    Handlers
    - Type: CrunchDataHandler
      Resources:
      - Name: FooSource2
        Accessor: trainingDatastore
      FooSource1:
        Type: WebResource
      FooSource2:
        Type: DatabaseResource
      DataSource:
        Type: RestResource
```

A portion of the disclosure of this patent document contains material that may be subject to copyright protection. The copyright owner has no objection to the facsimile reproduction by anyone of the patent document or the patent disclosure as it appears in the Patent and Trademark Office patent files or records, but otherwise reserves all copyrights whatsoever.

This code creates two services—FaceRecog.tsk and crunchdata.tsk. FaceRecog.tsk: is a business logic 10. FaceRecogHandler is powered by WebResource. FaceRecogModelTrainer is powered by some Database Resource. crunchdata.tsk: uses CrunchDataHandler powered by RestApi. Since FooResource2 is a passive resource, it can be invoked from the Handler. crunchdata.tsk hands off data to FaceRecog.tsk over Database Resource Note, a Message Trap Resource is one exception to this. The Message Trap resource is an active resource—listening for MsgTraps, but it is listed with passive resources. This is because Message Trap applies to the whole service. Any messages that come in the message trap can be delivered to all Handlers.

One example of this Message Trap is below. In this example, eventmon.tsk task monitors for special events like Security Halt, Exch Close, Exch Open, Region Midnight Rollover, User/Firm disablement, etc. and accordingly either takes action (cancels all orders on user/firm disablement or security halt) or broadcasts the event to everyone (midnight rollover). It also monitors order transactions for any anomalies and cancels the order if one is detected. So, it requires:

reference data—to trigger reference data updates (e.g., firm/use disablements);

order cache—to iterate through orders and cancel specific ones; and order transaction updates—to look for anomalies.

The relevant YAML configuration file is as follows, as shown in Table 11:

TABLE 11

```
- Server: eventmon
  Handlers:
  - Type: OrderCache
    Accessor: orderCache
    Resources:
    - Name: MainBus
  - Type: Aptrefdataclient
    Accessor: refData
    Resources:
    - Name: RefDataMainBus
  - Type: Apteventmon
    Resources:
    - Name: MainBus
      Accessor: busMessenger
    - Name: RefDataMainBus
      Resources:
    - Name: AptTimer
      Accessor: timer
    - Name: MsgTrap
```

A portion of the disclosure of this patent document contains material that may be subject to copyright protection. The copyright owner has no objection to the facsimile reproduction by anyone of the patent document or the patent disclosure as it appears in the Patent and Trademark Office patent files or records, but otherwise reserves all copyrights whatsoever.

OrderCache Handler is powered by MainBus. The OrderCache handler's job is to read order transactions from MainBus and build order cache. And as an accessor orderCache( ).

Aptrefdataclient is powered by RefDataMainBus. The reference data handler job is to read reference data bus and build refdata cache. And accessor is refData( ).

Apteventmon Handler is powered by MainBus. The Eventmon handler described above powered by order transactions bus(MainBus) and reference data bus(RefDataMainBus). And it can use orderCahce( ) and refData( ) as and when necessary.

A passive resource, Timer, is provided to set up timers for midnight rollover.

Additionally, meta-data can be used for the entire system (all services listed in Tasks) as follows:

```
project-config:
  project-name: bdsk-deploy
  user-id: hzhao171
  project-prefix: bdsk
  user-name: hzhao171
  project-description: bdesk high-touch workflow
```

The only clarification would be regarding a project-prefix. Since combinations of Handlers and Resources can be reused in multiple deployments, a clash in service names may exists. To circumvent that, the code generation tool prefixes the task name with project-prefix.

As an example, if ExampleHandler is used by teams Expense, Bob, and Security, three different deployment YAML files can be created. Assume the prefixes chosen are 'exp', 'bob', and 'scty', as shown in Table 12 below.

TABLE 12

```
project-config:
  project-name: validate-expense
  user-id: sdanashe
  project-prefix: exp
  user-name: sdanashe
  project-description: validate team lunch/dinner with pic
Tasks:
- Server: FaceRecog
  Handlers:
  - Type: FaceRecogHandler
    Resources:
    - Name: FooSource1
  - Type: FaceRecogModelTrainer
    Resources:
    - Name: FooSource2
- Server: crunchdata
  Handlers:
  - Type: CrunchDataHandler
    Resources:
    - Name: DataSource
    Resources:
    - Name: FooSource2
      Accessor: trainingDatastore
FooSource1:
  Type: WebResource
FooSource2:
  Type: DatabaseResource
DataSource:
  Type: RestResource
```

A portion of the disclosure of this patent document contains material that may be subject to copyright protection. The copyright owner has no objection to the facsimile reproduction by anyone of the patent document or the patent disclosure as it appears in the Patent and Trademark Office patent files or records, but otherwise reserves all copyrights whatsoever.

Accordingly, the task names would be expFaceRecog.tsk and experunchdata.tsk.

Runtime Configuration

Thus, it is clear that the framework views a service (task) as a combination of components (e.g., C++ libraries). It treats runtime configuration files similarly. If a configuration file is represented as a tree (e.g., expressed in JSON), each component is assigned as a subtree. Each component can design and maintain how its subtree should look like. For example, for the above eventmon.tsk, as shown in Table 13:

TABLE 13

```
mainbus:
  Topic: kf-something
refdatabus:
  Topic: kf-something-else
logging:
  filepath: "/bb/data/logs/bdskeventmon.log.%Y%M%D"
bdskeventmon:
  retryInterval: 5
mtrap:
  Server:
  - bdsk/eventmon/msgtrap
```

A portion of the disclosure of this patent document contains material that may be subject to copyright protection. The copyright owner has no objection to the facsimile reproduction by anyone of the patent document or the patent disclosure as it appears in the Patent and Trademark Office patent files or records, but otherwise reserves all copyrights whatsoever.

Each component gets its own subtree. And each component will read values of the subtree as is pertinent. The tree is relatively flat—all subtrees are on the top level. Instead of having a deep unmanageable tree, a tree for each component at the top level can be used.

In the compile-time configuration file, for each component that is specified, the ConfigName is specified. During runtime, the framework uses the ConfigName for the component to lookup the subtree in the runtime config, as shown in Table 14.

TABLE 14

```
Handlers:
- Type: Apteventmon
  ConfigName: bdskeventmon # added this line
  Resources:
  - Name: MainBus
  - Name: RefDataMainBus
  Resources:
  - Name: AptTimer
    Accessor: timer
  - Name: MsgTrap
    ConfigName: mtrap # added this line
MainBus:
  Type: MessageBusResource
  ConfigName: mainbus # added this line
  transport
    Type: CppKafkaTransport
  encoder:
    Type: BERProtocol
RefDataMainBus:
  Type: MessageBusResource
  ConfigName: refdatabus # added this line
  transport
    Type: CppKafkaTransport
  encoder:
    Type: RefDataEncoder
```

A portion of the disclosure of this patent document contains material that may be subject to copyright protection. The copyright owner has no objection to the facsimile reproduction by anyone of the patent document or the patent disclosure as it appears in the Patent and Trademark Office patent files or records, but otherwise reserves all copyrights whatsoever.

Thus, ConfigName in compile-time config corresponds to subtree name in runtime config.

Runtime

In order to start tasks, the following two commands may be run:

expFaceRecog.tsk--config    <runtime-config>--instance FaceRecog or expFaceRecog.tsk-c<runtime-config>FaceRecog When a system includes multiple services, it can become an issue to start and stop the entire system correctly. To facilitate this, the framework provides an example_runtime.py script. This script takes in a CSV file that lists all the instances of every service. This CSV file is also generated by the code generation tool. Code generation tool reads the Runtime section of the Server to generate this. For example,

```
Runtime:
  Instances:
  - name: bdskeventmon
    ConfigFile: bdskeventmon.json
```

Thus, if there is a single instance of bdskeventmon, it can use the specified config file. This is optional and can be included for convenience. Additional instances which are not specified here may be brought up if desired.

A sample partial generated csv file is shown below:

```
bdskeventmon,bdskeventmon.tsk ,bdsk-deploy/bdskeventmon.json
bdskmktdatamgr,bdskmktdatamgr.tsk ,bdsk-deploy/bdskmktdatamgr.json
bdskbuslogger,bdskbuslogger.tsk ,bdsk-deploy/bdskbuslogger.json
bdskmodaprxy,bdskmodaprxy.tsk ,bdsk-deploy/bdskmodaprxy.json
```

Example of how to Use Example_Tasks.Py

```
/opt/bb/bin/example_runtime.py -1 automation-deploy -u
bdskeventmon # instance up
/opt/bb/bin/example _runtime.py -1 automation-deploy -d
bdskeventmon # instance down
/opt/bb/bin/example _runtime.py -1 automation-deploy -b
bdskeventmon # instance bounce
/opt/bb/bin/example _runtime. py -1 automation-deploy -U
# all instances up
/opt/bb/bin/example _runtime. py -1 automation-deploy -D
# all instances down
/opt/bb/bin/example _runtime. py -1 automation-deploy -B
# all instances bounce
```

Figure 7:
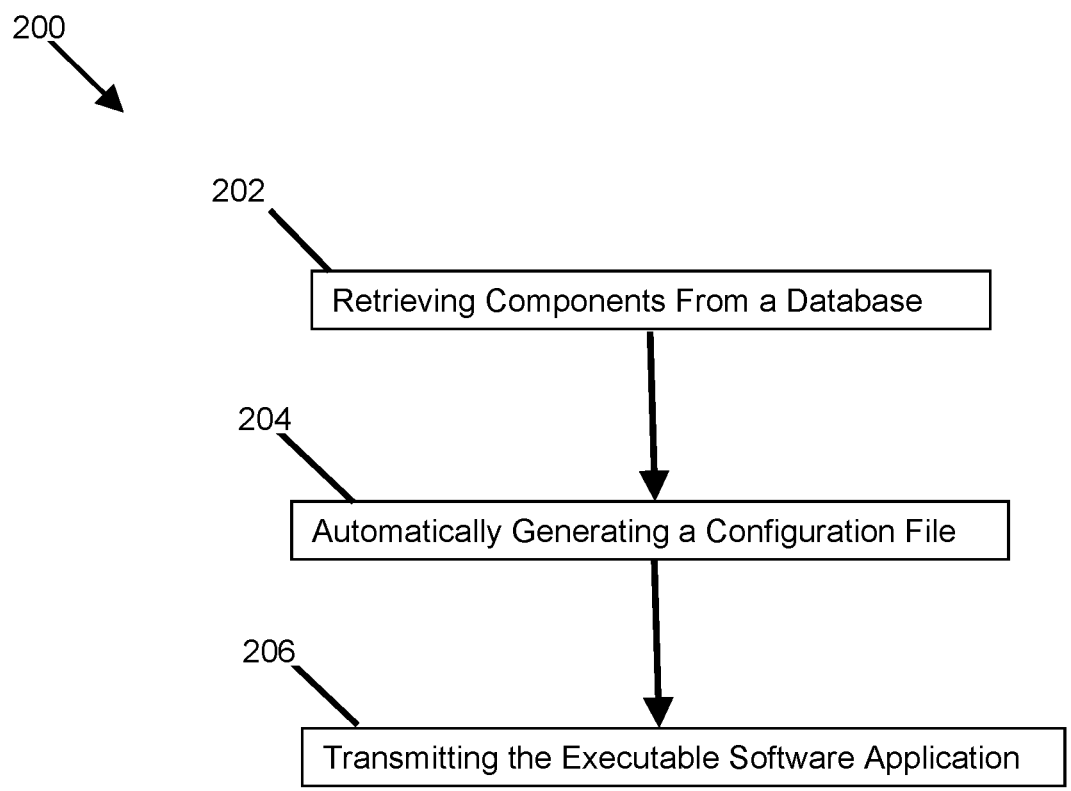
FIG. 7 is a schematic diagram of a method flow according to an embodiment of the disclosure.

An embodiment of a method 200 is discussed in reference to FIG. 7. Method 200 is a method to implement a strongly-typed software application operable in a computing environment in an application development framework. The method 200 includes step 202, which is a step retrieving components from a database. These components can include: logic code configured to perform a task, input/output (I/O) code configured to provide input from a source to the logic code, and feature code configured to produce one or more functions.

Further in method 200, step 204 is automatically generating a configuration file. This configuration file of step 204 is in a strongly-typed programming language, wherein the configuration file is configured to register the components into an executable software application.

As a further optional step, that executable software application from step 204 is transmitted in step 206 to a user for implementation.

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented using a computer program product tangibly embodied in an information carrier, e.g., in a non-transitory machine-readable storage device, for execution by a programmable processor; and the method and workflow steps described herein, including one or more of the steps or functions of discussed above, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 8:
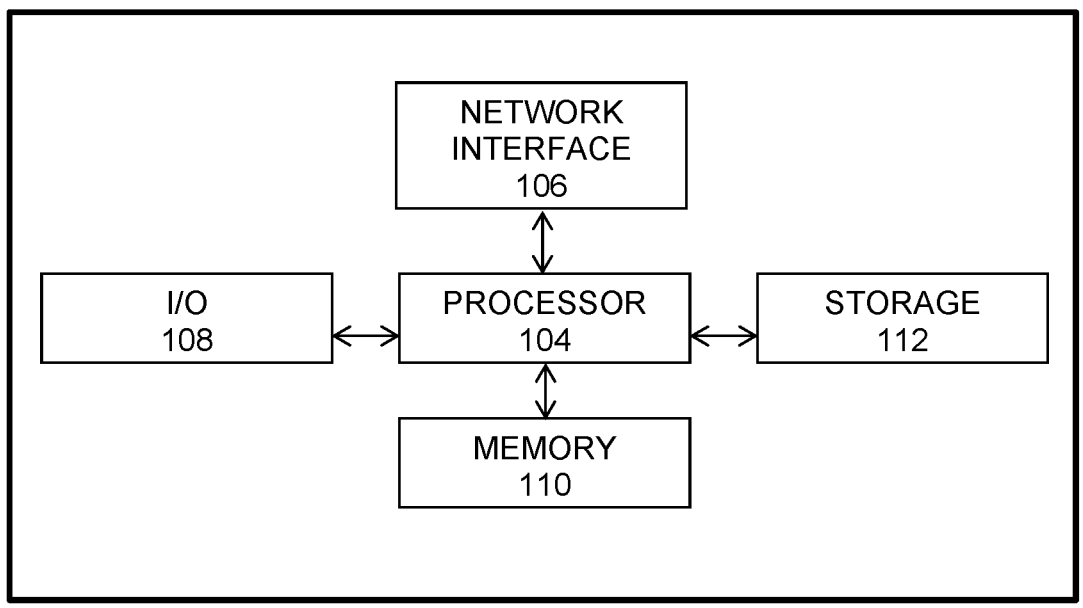
FIG. 8 is a high-level block diagram of an example computer that may be used to implement systems, apparatus, and methods described herein.

A high-level block diagram of an example computer that may be used to implement systems, apparatus, and methods described herein is shown in FIG. 8. Alternatively, or in addition to, the systems, apparatus, and methods described herein can be hosted and/or distributed in a cloud-based environment located remotely at a data center (e.g. Google™ Cloud Services or Amazon™ Web Service).

The computer shown in FIG. 8 includes a processor 104 operatively coupled to a data storage device 112 and a memory 110. Processor 104 controls the overall operation of computer by executing computer program instructions that define such operations. The computer program instructions may be stored in data storage device 112, or other computer readable medium, and loaded into memory 110 when execution of the computer program instructions is desired. Thus, the method and workflow steps or functions described above can be defined by the computer program instructions stored in memory 110 and/or data storage device 112 and controlled by processor 104 executing the computer program instructions. For example, the computer program instructions can be implemented as computer executable code programmed by one skilled in the art to perform the method and workflow steps or functions described above. Accordingly, by executing the computer program instructions, the processor 104 executes the method and workflow steps or functions described above. The computer may also include one or more network interfaces 106 for communicating with other devices via a network. The computer may also include one or more input/output devices 108 that enable user interaction with the computer (e.g., display, keyboard, mouse, speakers, buttons, etc.).

Processor 104 may include both general and special purpose microprocessors, and may be the sole processor or one of multiple processors of the computer. Processor 104 may include one or more central processing units (CPUs), for example. Processor 104, data storage device 112, and/or memory 110 may include, be supplemented by, or incorporated in, one or more application-specific integrated circuits (ASICs) and/or one or more field programmable gate arrays (FPGAs).

Data storage device 112 and memory 110 each include a tangible non-transitory computer readable storage medium in any suitable location, such as a database in a remote location. Data storage device 112, and memory 110, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 108 may include peripherals, such as a printer, scanner, display screen, etc. For example, input/output devices 108 may include a display device such as a cathode ray tube (CRT) or liquid crystal display (LCD) monitor for displaying information to the user, a keyboard, and a pointing device such as a mouse or a trackball by which the user can provide input to the computer.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method to implement a strongly-typed software application operable in a computing environment in an application development framework, the method comprising:
    retrieving components from a database, wherein the components comprise:
        logic code configured to perform a task,
        input/output (I/O) code configured to provide input from a source to the logic code, and
        feature code configured to produce one or more functions;
    automatically generating a configuration file, wherein the configuration file is in a strongly-typed programming language, and wherein the configuration file is configured to register the components into an executable software application;
    automatically generating a unique prefix for a name of the task in the configuration file based on meta-data of the task;
    compiling the registered components, wherein the compiling comprises verifying that the registered components do not use an operator with inconsistent expressions;
    deploying the executable software application and the configuration file in a deployable unit to a computing environment of a user; and
    implementing the executable software application in the computing environment of the user.

2. The method of claim 1, wherein the configuration file is a YAML (YAML Ain't Markup Language) configuration file.

3. The method of claim 1, wherein the strongly-typed programming language is selected from the group consisting of C++, Java, and TypeScript.

4. The method of claim 1, wherein the executable software application comprises one or more runtime dependencies of the configuration file.

5. The method of claim 1, wherein the logic code is further configured to be reactive to messages.

6. The method of claim 1, wherein the I/O code is further configured to read received data, convert the received data to a message that the logic code is configured to implement, and transmit the message to the logic code.

7. The method of claim 1, wherein the executable software application is configured to actively listen for messages on a messaging system.

8. A non-transitory computer readable storage medium having computer-executable instructions recorded thereon that, when executed on a computer, configure the computer to perform a method to implement a strongly-typed software application operable in a computing environment in an application development framework, the method comprising:

retrieving components from a database, wherein the components comprise:
  logic code configured to perform a task,
  input/output (I/O) code configured to provide input from a source to the logic code, and
  feature code configured to produce one or more functions;
automatically generating a configuration file, wherein the configuration file is in a strongly-typed programming language, and wherein the configuration file is configured to register the components into an executable software application;
automatically generating a unique prefix for a name of the task in the configuration file based on meta-data of the task;
compiling the registered components, wherein the compiling comprises verifying that the registered components do not use an operator with inconsistent expressions;
deploying the executable software application and the configuration file in a deployable unit to a computing environment of a user; and
implementing the executable software application in the computing environment of the user.

9. The non-transitory computer readable storage medium of claim 8, wherein the configuration file is a YAML (YAML Ain't Markup Language) configuration file.

10. The non-transitory computer readable storage medium of claim 8, wherein the strongly-typed programming language is selected from the group consisting of C++, Java, and TypeScript.

11. The non-transitory computer readable storage medium of claim 8, wherein the executable software application comprises one or more runtime dependencies of the configuration file.

12. The non-transitory computer readable storage medium of claim 8, wherein the logic code is further configured to be reactive to messages.

13. The non-transitory computer readable storage medium of claim 8, wherein the I/O code is further configured to read received data, convert the received data to a message that the logic code is configured to implement, and transmit the message to the logic code.

14. The non-transitory computer readable storage medium of claim 8, wherein the executable software application is configured to actively listen for messages on a messaging system.

15. A system comprising:
a memory operable to store at least one program; and
at least one processor communicatively coupled to the memory, in which the at least one program, when executed by the at least one processor, causes the at least one processor to perform a method to implement a strongly-typed software application operable in a computing environment in an application development framework, the method comprising:
retrieving components from a database, wherein the components comprise:
  logic code configured to perform a task,
  input/output (I/O) code configured to provide input from a source to the logic code, and
  feature code configured to produce one or more functions;
automatically generating a configuration file, wherein the configuration file is in a strongly-typed programming language, and wherein the configuration file is configured to register the components into an executable software application;
automatically generating a unique prefix for a name of the task in the configuration file based on meta-data of the task;
compiling the registered components, wherein the compiling comprises verifying that the registered components do not use an operator with inconsistent expressions;
deploying the executable software application and the configuration file in a deployable unit to a computing environment of a user; and
implementing the executable software application in the computing environment of the user.

16. The system of claim 15, wherein the configuration file is a YAML (YAML Ain't Markup Language) configuration file.

17. The system of claim 15, wherein the strongly-typed programming language is selected from the group consisting of C++, Java, and TypeScript.

18. The system of claim 15, wherein the executable software application comprises one or more runtime dependencies of the configuration file.

19. The system of claim 15, wherein the I/O code is further configured to read received data, convert the received data to a message that the logic code is configured to implement, and transmit the message to the logic code.

20. The system of claim 15, wherein the executable software application is configured to actively listen for messages on a messaging system.

* * * * *